F. P. HART.
Marking Gage.
No. 12,861.  Patented May 15, 1855.
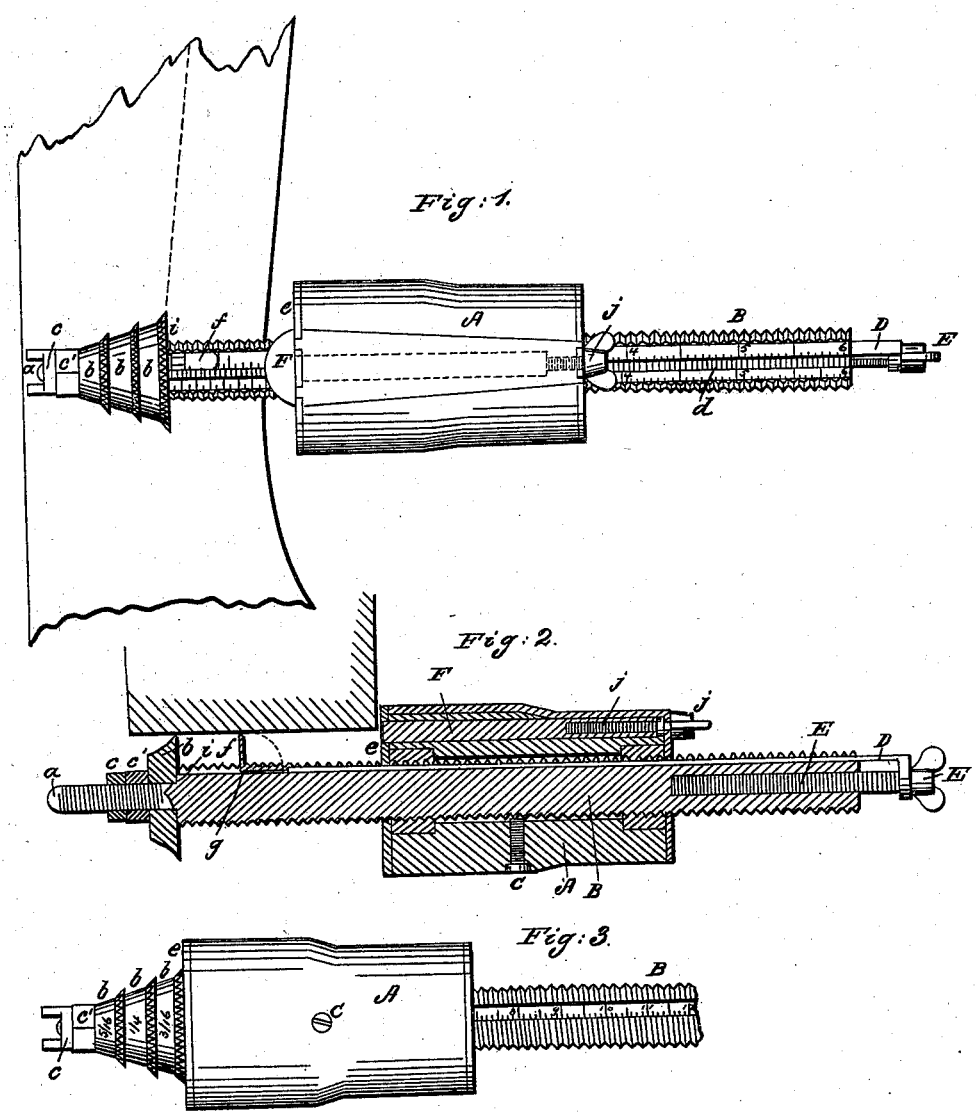

UNITED STATES PATENT OFFICE.

FRANCIS P. HART, OF CHANDLERSVILLE, PENNSYLVANIA.

GAGE FOR SLITTING LUMBER.

Specification of Letters Patent No. 12,861, dated May 15, 1855.

*To all whom it may concern:*

Be it known that I, FRANCIS P. HART, of Chandlersville, in the county of Chester and State of Pennsylvania, have invented certain new and useful Improvements in Gages for Marking or Slitting Lumber and other Materials; and I do hereby declare that the following is a full, clear, and exact description of the same, reference being had to the accompanying drawings, forming part of this specification, in which—

Figure 1, is a longitudinal outside view of a gage constructed according to my invention. Fig. 2, is a longitudinal section of the same. Fig. 3, a longitudinal outside view showing a different side to Fig. 1.

Similar letters of reference indicate corresponding parts in the several figures.

This invention consists firstly in a contrivance for gaging in an oblique direction relatively to a given edge so as to mark off strips of tapering form. Secondly, in a certain arrangement of one of two scribers employed for cutting mortises whereby it may be rendered inoperative when the gage is used for scribing a single line. Thirdly in a sliding guide piece to be brought into use for gaging curves, circles and irregular forms.

To enable others skilled in the art to make and use my invention I will proceed to describe its construction and operation.

A, is the stock of the gage which has a female screw in each end to receive and fit a fine threaded male screw which extends nearly along the whole length of the shaft B, and is also furnished with a binding screw C, by which to secure it at any point on the shaft. The shaft has a pin $a$, turned down at one end to receive one of a number of wheels $b$, $b$, which have sharp pointed teeth, on their peripheries. These wheels are confined to the pin by a screw on the pin and two nuts $c$, $c'$, and may be either allowed to run loosely on the pin or be clamped tight up to a shoulder on the shaft at the back of the pin, according to the purpose for which the gage is to be used. In gaging obliquely for articles of tapering form, the wheel $b$, which is placed on the pin is clamped by the nuts $c$, $c'$, tight up to the shoulder $i$, on the shaft, and the binding screw C, in the stock is loosened to allow the screw to turn in the stock. The shaft is adjusted in the stock by a scale $d$, (see Fig. 1) of inches or other equal parts, which commences at the shoulder $i$, of the shaft and in order to bring the teeth of the wheel $b$, at a distance from the face $e$, of the stock, corresponding with the width of one end of the strip or article to be gaged. The gage is then run along the stuff in the same way as a common gage, and the wheel receiving rotary motion through the bite of its teeth on the stuff as it runs along it, turns the screw, and, according to the direction of its revolution, either increases or diminishes the distance between the wheel and the face of the stock thus running and scribing obliquely to the guiding edge. By changing the size of the wheel $b$, the taper may be greater or less, according as the wheel is smaller or larger. In gaging parallel the wheel $b$, is left free by the nuts $c$, $c'$, to turn easily and the stock and shaft are secured together by the binding screw C.

For the purpose of gaging mortises the gage has a slider D, fitted to a groove in its shaft said slider carrying a scriber $f$, which is hinged to it so as to be capable when not required for use of being folded down to be received within the groove in the shaft as shown in red outline in Fig. 1. When thrown outward the scriber $f$, is kept at a right angle to the shaft by a square shoulder at $g$, see Fig. 2, and when cutting, is kept up to that position by reason of its edge being beveled on the opposite side to the shoulder. The outer face of the slider D, has a scale of inches or equal parts like that on the scale $d$, on the shaft of the gage, and it is adjusted by means of a screw E, passing through a loop at its end and working in a female screw in the opposite end of the shaft to where the wheels $b$, are fitted. For gaging both sides of a mortise, the scale $d$, on the shaft and the scale on the slider D, enable the scriber $f$, to be adjusted by the screw E, with accuracy, at a distance from the edge of the wheel $b$, equal to the required width of the mortise, and the stock is adjusted on the shaft to bring its face to a distance from the edge of the scriber equal to the required distance from the edge of the stuff. The toothed edge of the wheel scribes one side and the scriber $f$, the other side of the mortise. The toothed edge prevents the gage following the grain of the wood.

F, is the sliding guide piece to be employed in gaging from a circular curved or irregular edge, consisting of a flat piece of metal fitted in a slot made in the stock parallel with the shaft, and adjustable lengthwise by a screw $j$, at the back. The front end is of rounded form as shown in Fig. 1. In gaging straight work the guide piece F, is all drawn into the stock, by means of the screw $j$, and the face of the stock serves as the guide; but for gaging circular, curved or irregular work the guide piece is screwed out beyond the face and its rounded end forms the bearing, and allows the gage to follow the sinuosities of any curved or irregular edge. This instrument will be useful for saddlers or other workers in leather as well as workers in wood. As a gage for cutting leather, a sharp edge rotary cutter may be substituted for the toothed wheel $b$.

What I claim as my invention and desire to secure by Letters Patent is.

1. The employment of a rotary cutter secured to the shaft of the gage, when the said shaft screws into the stock and is made capable of turning freely therein as described, for the purpose of gaging taper work.

2. Attaching the adjustable scriber $f$, by a hinge joint constructed with a shoulder $g$, substantially as described, to the slider which carries it, so that it may be rigid when extended for mortising but may fold into the recess in which the said slider works when the gage is used for other purposes than mortising.

3. The employment of a round faced guide piece F, fitted to slide within the stock of the gage, so as to be withdrawn into it when the gage is to be used for straight work, but to be protruded from it when required to serve as a guide for gaging curved circular or irregular work, as herein fully set forth.

FRANCIS P. HART.

Witnesses:
PETER HART,
HARLAN C. RICHARDSON.